US 6,635,709 B2

(12) United States Patent
Kato et al.

(10) Patent No.: US 6,635,709 B2
(45) Date of Patent: Oct. 21, 2003

(54) DISPERSION STABILIZER FOR SUSPENSION POLYMERIZATION OF VINYL COMPOUND

(75) Inventors: Masaki Kato, Kurashiki (JP); Naokiyo Inomata, Kurashiki (JP); Seiji Tanimoto, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 141 days.

(21) Appl. No.: 09/907,941

(22) Filed: Jul. 19, 2001

(65) Prior Publication Data

US 2003/0008972 A1 Jan. 9, 2003

(30) Foreign Application Priority Data

Jul. 19, 2000 (JP) ........................................ 2000/219615
Jul. 19, 2000 (JP) ........................................ 2000/219616
Jul. 19, 2000 (JP) ........................................ 2000/219618

(51) Int. Cl.$^7$ ............................ C08L 29/04; C08G 63/91
(52) U.S. Cl. ........................... 525/57; 525/56; 525/60; 525/61; 525/386; 526/202; 526/344.2; 526/344
(58) Field of Search ....................... 525/56, 57, 60, 525/61, 386; 526/202, 344, 344.2

(56) References Cited

U.S. PATENT DOCUMENTS 4,388,442 A * 6/1983 Taniguchi et al. ............ 525/60
4,920,187 A * 4/1990 Kashihara et al. .......... 526/193
5,900,463 A 5/1999 Tanimoto et al.
6,156,840 A 12/2000 Nakamae et al.

FOREIGN PATENT DOCUMENTS

JP        361108603 A   * 10/1979
JP        54127490 A   * 5/1986
JP        8-259609    10/1996

* cited by examiner

*Primary Examiner*—Judy M. Reddick
(74) *Attorney, Agent, or Firm*—Oblon, Spivak, McClelland, Maier & Neustadt, P.C.

(57) ABSTRACT

A dispersion stabilizer for suspension polymerization of a vinyl compound containing a vinyl alcohol polymer (A) having a content of an ethylene unit of 0.5 to 10 mol %, a degree of saponification of 60 mol % or more and a degree of polymerization of 600 or more and a vinyl alcohol polymer (B) selected from the group consisting of a vinyl alcohol polymer (B1) having a content of an ethylene unit of 0.5 to 10 mol %, a degree of saponification of 20 to 80 mol % and a degree of polymerization of 100 to 600, a vinyl alcohol polymer (B2) having a degree of saponification of 20 to 60 mol % and a degree of polymerization of 100 to 600 and a vinyl alcohol polymer (B3) having a content of an ethylene unit of 0.5 to 10 mol %, a degree of saponification of 90 mol % or more and a degree of polymerization of 1,000 or more.

16 Claims, No Drawings

DISPERSION STABILIZER FOR SUSPENSION POLYMERIZATION OF VINYL COMPOUND

BACKGROUND OF THE INVENTION

1. Field of the Invention

The present invention relates to a dispersion stabilizer for suspension polymerization of a vinyl compound. More specifically, the invention relates to a dispersion stabilizer for suspension polymerization of a vinyl compound which, by the use of a small amount, exhibits quite an excellent suspension polymerization stability upon providing an effect that polymer scales are less adhered to an inner wall of a polymerization vessel and can produce, through suspension polymerization of a vinyl compound, vinyl polymer granules having a high plasticizer absorption, a sharp particle size distribution, a porosity and a high bulk density.

2. Discussion of the Background

The production of a vinyl polymer such as a vinyl chloride resin has been widely conducted industrially by suspension polymerization in which a vinyl compound such as vinyl chloride is dispersed in an aqueous medium in the presence of a dispersion stabilizer and polymerization is conducted using an oil-soluble initiator. In general, the factors governing the quality of a vinyl polymer include a conversion, a water/monomer ratio, a polymerization temperature, a type and an amount of an initiator, a type of a polymerization vessel, a stirring rate and a type of a dispersion stabilizer. Among these factors, a type of a dispersion stabilizer has a great effect.

The performances required of a dispersion stabilizer for suspension polymerization of a vinyl compound are as follows. (1) It functions, by the use of a small amount thereof, to exhibit quite an excellent suspension polymerization stability and to make the particle size distribution of vinyl polymer granules obtained as sharp as possible, (2) it functions to make polymer granules as uniform and porous as possible to increase a rate of plasticizer absorption for increasing a processability, to facilitate the removal of a monomer such as vinyl chloride remaining in polymer granules and to prevent the formation of fish eyes in a molded product, (3) it functions to form polymer granules having a high bulk density, and (4) scales are not adhered to a polymerization vessel.

As a dispersion stabilizer for suspension polymerization of a vinyl compound, cellulose derivatives such as methylcellulose and carboxymethylcellulose and partially saponified polyvinyl alcohol have been so far used either singly or in appropriate combination. The ordinary dispersion stabilizer, however, do not necessarily meet the foregoing performances satisfactorily.

Further, Japanese Patent Laid-Open Nos. 127,490/1979, 95,104/1989, 140,303/1991, 80,709/1994 and 259,609/1996 propose a dispersion stabilizer for suspension polymerization of a vinyl compound made of a modified polyvinyl alcohol containing an ethylene unit. A dispersion stabilizer made of an ethylene-modified polyvinyl alcohol as proposed in Japanese Patent Laid-Open No. 127,490/1979 is problematic in that the use of a modified polyvinyl alcohol having a high content of an ethylene unit decreases a workability owing to a poor water solubility of a dispersion stabilizer or requires the use of a water-organic solvent medium for improving the solubility of the dispersion stabilizer and the use of the organic solvent invites a factor that waste water after suspension polymerization exerts an adverse effect on the environment. A dispersion stabilizer made of an ethylene-modified polyvinyl alcohol having an ionic group in a side chain as proposed in Japanese Patent Laid-Open Nos. 95,104/1989 and 140,303/1991 is problematic in that a water solubility is improved, but bubbling is liable to occur in the suspension polymerization of vinyl chloride which leads to adhesion of scales to a polymerization vessel. A dispersion stabilizer made of an ethylene-modified polyvinyl alcohol as proposed in Japanese Patent Laid-Open No. 80,709/1994 gives a relatively well-balanced vinyl chloride resin, but a plasticizer absorption or a sharpness of a particle size distribution of the vinyl chloride resin does not necessarily reach a satisfactory level. Further, a dispersion stabilizer using a combination of an ethylene-modified polyvinyl alcohol and a polyvinyl alcohol polymer as proposed in Japanese Patent Laid-Open No. 259,609/1996 improves, because of an excellent anti-foaming effect in a polymerization vessel, a problem that scales are adhered to a reaction vessel by bubbling in the suspension polymerization of vinyl chloride. However, a plasticizer absorption or a sharpness of a particle size distribution of the resulting vinyl chloride resin does not necessarily reach a satisfactory level.

Under these circumstances, the invention aims to provide a dispersion stabilizer for suspension polymerization of a vinyl compound which, by the use of a small amount, exhibits quite an excellent suspension polymerization stability and can produce, through suspension polymerization of a vinyl compound, vinyl polymer granules having a high plasticizer absorption, a sharp particle size distribution, a porosity and a high bulk density. Further, it aims to provide a dispersion stabilizer for suspension polymerization of a vinyl compound which can produce vinyl polymer granules having characteristics that a vinyl compound remaining in vinyl polymer granules is easy to remove, scattering of a powder less occurs in handling and a biting property into a molding machine is good.

SUMMARY OF THE INVENTION

The present inventors have assiduously conducted investigations, and have consequently found that the foregoing aims are attained by a dispersion stabilizer for suspension polymerization of a vinyl compound comprising a vinyl alcohol polymer (A) having a content of an ethylene unit of 0.5 to 10 mol %, a degree of saponification of 60 mol % or more and a degree of polymerization of 600 or more and a vinyl alcohol polymer (B) selected from a vinyl alcohol polymer (B1) having a content of an ethylene unit of 0.5 to 10 mol %, a degree of saponification of 20 to 80 mol % and a degree of polymerization of 100 to 600, a vinyl alcohol polymer (B2) having a degree of saponification of 20 to 60 mol % and a degree of polymerization of 100 to 600 and a vinyl alcohol polymer (B3) having a content of an ethylene unit of 0.5 to 10 mol %, a degree of saponification of 90 mol % or more and a degree of polymerization of 1,000 or more. This finding has led to the completion of the invention.

DETAILED DESCRIPTION OF THE PREFERRED EMBODIMENTS

The invention is described in detail below.

The content of the ethylene unit of the vinyl alcohol polymer (A) used in the invention is 0.5 to 10 mol %, preferably 1 to 10 mol %, more preferably 1.5 to 8 mol %. When the content of the ethylene unit is less than 0.5 mol %, adhesion of scales to a reaction vessel is increased in the suspension polymerization of the vinyl compound. When it exceeds 10 mol %, a water solubility of the vinyl alcohol polymer is decreased to worsen a handleability.

The degree of saponification of the vinyl alcohol polymer (A) is 60 mol % or more, preferably 65 to 95 mol %, more preferably 70 to 90 mol %. When the degree of saponification is less than 60 mol %, the water solubility of the vinyl alcohol polymer is decreased to worsen the handleability.

The degree of polymerization of the vinyl alcohol polymer (A) is 600 or more, preferably 600 to 8,000, more preferably 650 to 3,500. When the degree of polymerization of the vinyl alcohol polymer is less than 600, the polymerization stability is decreased in the suspension polymerization of the vinyl compound.

The content of the ethylene unit of the vinyl alcohol polymer (B1) used in the invention is 0.5 to 10 mol %, preferably 1 to 10 mol %, more preferably 1.5 to 8 mol %. When the content of the ethylene unit is less than 0.5 mol %, adhesion of scales to a reaction vessel is increased in the suspension polymerization of the vinyl compound. When it exceeds 10 mol %, the water solubility of the vinyl alcohol polymer is decreased to worsen the handleability.

The degree of saponification of the vinyl alcohol polymer (B1) is 20 to 80 mol %, preferably 25 to 80 mol %, more preferably 30 to 75 mol %. When the degree of saponification deviates from the range of 20 to 80 mol %, the particle size distribution of vinyl polymer granules obtained by the suspension polymerization of a vinyl compound is widened.

The degree of polymerization of the vinyl alcohol polymer (B1) is 100 to 600, preferably 150 to 550, more preferably 200 to 550. When the degree of polymerization is less than 100, the polymerization stability is decreased in the suspension polymerization of the vinyl compound. When it exceeds 600, the plasticizer absorption of the vinyl polymer obtained by the suspension polymerization of the vinyl compound is decreased.

Further, it is preferable that a difference in degree of saponification between the vinyl alcohol polymer (A) and the vinyl alcohol polymer (B 1) is 15 mol % or more and/or a difference in degree of polymerization therebetween is 200 or more.

The degree of saponification of the vinyl alcohol polymer (B2) used in the invention is 20 to 60 mol %, preferably 25 to 60 mol %, more preferably 30 to 55 mol %. When the degree of saponification deviates from the range of 20 to 60 mol %, the particle size distribution of the vinyl polymer granules obtained by the suspension polymerization of the vinyl compound is widened.

The degree of polymerization of the vinyl alcohol polymer (B2) is 100 to 600, preferably 150 to 550, more preferably 200 to 550. When the degree of polymerization is less than 100, the polymerization stability is decreased in the suspension polymerization of the vinyl compound. When it exceeds 600, the plasticizer absorption of the vinyl polymer obtained by the suspension polymerization of the vinyl compound is decreased.

Further, it is preferable that a difference in degree of saponification between the vinyl alcohol polymer (A) and the vinyl alcohol polymer (B2) is 15 mol % or more and/or a difference in degree of polymerization therebetween is 200 or more.

The content of the ethylene unit of the vinyl alcohol polymer (B3) used in the invention is 0.5 to 10 mol %, preferably 1 to 10 mol %, more preferably 1.5 to 8 mol %. When the content of the ethylene unit is less than 0.5 mol %, adhesion of scales to a reaction vessel is increased in the suspension polymerization of the vinyl compound. When it exceeds 10 mol %, the water solubility of the vinyl alcohol polymer is decreased to worsen the handleability.

The degree of saponification of the vinyl alcohol polymer (B3) is 90 mol % or more, preferably 91 mol % or more, more preferably 92 mol % or more. When the degree of saponification is less than 90 mol %, a resin having a high bulk density cannot be obtained.

The degree of polymerization of the vinyl alcohol polymer (B3) is 1,000 or more, preferably 1,000 to 8,000, more preferably 1,000 to 3,500. When the degree of polymerization is less than 1,000, a resin having a high bulk density cannot be obtained.

Further, it is preferable that a difference in degree of saponification between the vinyl alcohol polymer (A) and the vinyl alcohol polymer (B3) is 5 mol % or more and/or a difference in degree of polymerization therebetween is 200 or more. It is more preferable that the difference in degree of saponification is 10 mol % or more and/or the difference in degree of polymerization is 200 or more.

In the dispersion stabilizer for suspension polymerization in the invention, a vinyl alcohol polymer (A)/vinyl alcohol polymer (B) ratio is not strictly limited. A component (A)/component (B) weight ratio is usually 95/5 to 20/80.

When the vinyl alcohol polymer (B) is the vinyl alcohol polymer (B1) or the vinyl alcohol polymer (B2), the component (A)/component (B) weight ratio is preferably 95/5 to 30/70, more preferably 95/5 to 50/50. When the component (A)/component (B) weight ratio exceeds 95/5, there is a tendency that the plasticizer absorption of the vinyl polymer obtained by the suspension polymerization of the vinyl compound is decreased or the particle size distribution is widened. When it is less than 20/80, the polymerization stability might be decreased in the suspension polymerization of the vinyl compound.

When the vinyl alcohol polymer (B) is the vinyl alcohol polymer (B3), the component (A)/component (B) weight ratio is preferably 80/20 to 30/70, more preferably 70/30 to 40/60. When the component (A)/component (B)weight ratio exceeds 95/5, there is a likelihood that a resin having a high bulk density is not obtained. When it is less than 20/80, the plasticizer absorption tends to be decreased.

In the invention, the amount of the dispersion stabilizer for suspension polymerization is not particularly limited. It is preferably 0.01 to 5 parts by weight, more preferably 0.02 to 2 parts by weight, further preferably 0.02 to 1 part by weight per 100 parts by weight of the vinyl compound. When it is less than 0.01 part by weight, the polymerization stability tends to be decreased in the suspension polymerization of the vinyl compound. When it exceeds 5 parts by weight, there is a tendency that a waste liquor after the suspension polymerization is opaque and chemical oxygen demand (COD) is increased.

The vinyl alcohol polymer (B1) and the vinyl alcohol polymer (B2) used in the invention are insoluble in water or dispersible in water. A self-emulsifiability can be imparted by introducing therein an ionic group such as a sulfonic group, an amino group, an ammonium group, a carboxyl group or a cationic group. Unless an ionic group is introduced, the water solubility or the water dispersibility of the vinyl alcohol polymer (B1) and the vinyl alcohol polymer (B2) might be decreased to worsen the handleability.

Further, in the vinyl alcohol polymer (A) and the vinyl alcohol polymer (B3) used in the invention, the water solubility can be increased by introducing an ionic group such as an ammonium group, a carboxyl group, a sulfonic group or an amino group. Alternatively, a nonionic group or a (long-chain) alkyl group may be introduced. It is advisable that the vinyl alcohol polymer (A) and the vinyl alcohol polymer (B3) is soluble in water having a temperature of 5 to 100° C., preferably 10 to 90° C.

The degree of saponification of the vinyl alcohol polymer having introduced therein an ionic group, a nonionic group or a (long-chain) alkyl group is obtained from a ratio of a vinyl ester group and a vinyl alcohol group, and a degree of saponification of an ionic group, a nonionic group or a (long-chain) alkyl group introduced is not included therein.

In the invention, a method for production of the vinyl alcohol polymer (A), the vinyl alcohol polymer (B1) and the vinyl alcohol polymer (B3) is not particularly limited. They can be obtained by a known method, for example, a method described in Japanese Patent Laid-Open No. 259,609/1996, namely, a vinyl ester monomer, ethylene and as required, a monomer having an ionic group are copolymerized and the resulting copolymer is saponified in a usual manner, or an end modification method in which a vinyl ester monomer and ethylene are copolymerized in the presence of a thiol compound such as a thiolacetic acid or mercaptopropionic acid and the copolymer is saponified.

Further, a method for production of the vinyl alcohol polymer (B2) is not particularly limited. It can be obtained by a known method, namely, a vinyl ester monomer and as required, a monomer having an ionic group are copolymerized and the resulting copolymer is saponified in a usual manner, or an end modification method in which a vinyl ester monomer is polymerized in the presence of a thiol compound such as a thiolacetic acid or mercaptopropionic acid and the polymer is saponified.

As a method for copolymerizing a vinyl ester monomer with ethylene, a known method such as a solution polymerization method, a bulk polymerization method, a suspension polymerization method or an emulsion polymerization method can be employed. As a polymerization initiator, an azo initiator, a peroxide initiator or a redox initiator is selected, as required, according to a polymerization method. As the saponification reaction, alcoholysis or hydrolysis using a known alkali catalyst or acid catalyst can be employed. Among others, a saponification reaction using methanol as a solvent and an NaOH catalyst is simple and most preferable.

Examples of the vinyl ester monomer herein include vinyl formate, vinyl acetate, vinyl propionate, vinyl butyrate, vinyl isobutyrate, vinyl pivalate, vinyl versatate, vinyl caproate, vinyl caprylate, vinyl laurylate, vinyl palmitate, vinyl stearate, vinyl oleate and vinyl benzoate. Of these, vinyl acetate is most preferable.

In the invention, the monomer having the ionic group which is used to introduce the ionic group into the vinyl alcohol polymer as required is not particularly limited. Examples thereof include sulfonic acid-containing monomers such as ethylenesulfonic acid, (meth)allylsulfonic acid, sulfoalkyl maleate, sulfoalkyl (meth)acrylate and acrylamido-2-methylpropanesulfonic acid and salts thereof; amino or ammonium group-containing monomers such as N(1,1-dimethyl-3-dimethylaminopropyl)(meth)acrylamide, N(1,1-dimethyl-3-dimethylaminobutyl)(meth)acrylamide, N-vinylimidazole, 2-methyl-N-vinylimidazole, vinyl-3-dimethylaminopropyl ether, vinyl-2-dimethylaminoethyl ether, allyl-3-dimethylaminopropyl ether, allyldimethylamine and methallyldimethylamine; and carboxyl group-containing monomers such as crotonic acid, maleic acid, fumaric acid, itaconic acid and (meth)acrylic acid.

In the invention, the vinyl alcohol polymer (A) and the vinyl alcohol polymer (B) may contain another monomer unit unless the gist of the invention is impaired. Examples of the available comonomer include α-olefins such as propylene, n-butene and isobutylene; acrylic acid and salts thereof; acrylic acid esters such 'as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide; acrylamide derivatives such as N-methylacrylamide, N-ethylacrylamide, N,N-dimethylacrylamide, diacetonacrylamide, acrylamidopropanesulfonic acid and salts thereof, acrylamidopropyldimethylamine and salts thereof or quaternary salts thereof, N-ethylolacrylamide and derivatives thereof; methacrylamide; methacrylamide derivatives such as N-methylmethacrylamide, N-ethylmethacrylamide, methacrylamidopropanesulfonic acid and salts thereof, methacrylamidopropyldimethylamine and salts thereof or quaternary salts thereof, N-methylolmethacrylamide and derivatives thereof; vinyl ethers such as methylvinyl ether, ethylvinyl ether, n-propylvinyl ether, i-propylvinyl ether, n-butylvinyl ether, i-butylvinyl ether, t-butylvinyl ether, dodecylvinyl ether and stearylvinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; unsaturated dicarboxylic acids such as maleic acid, itaconic acid and fumaric acid and salts thereof or esters thereof; vinylsilyl compounds such as vinyltrimethoxysilane; and isopropenyl acetate.

In the invention, the vinyl alcohol polymer (A) and the vinyl alcohol polymer (B) are usually dissolved or dispersed in an aqueous medium either separately or by being mixed, and subjected to the suspension polymerization of the vinyl compound.

In the dispersion stabilizer for suspension polymerization in the invention, a product heat-treated is used as the vinyl alcohol polymer (A) to further improve the stability in the suspension polymerization. The conditions for the heat treatment are not particularly limited. However, it is advisable that the heat treatment is conducted in an atmosphere of oxygen, air or nitrogen at a temperature of 100 to 200° C. for 0.5 to 20 hours. When the temperature of the heat treatment is less than 100° C., the effect of improving the stability in the suspension polymerization by the heat treatment is, in some cases, not satisfactorily exhibited. When it exceeds 200° C., the dispersion stabilizer for suspension polymerization might be colored.

At this time, for controlling the coloration of the dispersion stabilizer for suspension polymerization by the heat treatment, it is advisable that the vinyl alcohol polymer (A) is washed with a solvent such as methanol before the heat treatment.

When the heat-treated product is used as the vinyl alcohol polymer (A) in the dispersion stabilizer for suspension polymerization in the invention, it is advisable that the vinyl alcohol polymer (A) contains an acid having pKa at 25° C. of 3.5 to 5.5 and/or its metal salt (C), therefore the suspension polymerization stability is markedly excellent by the use of a small amount, and the coloration can be controlled in processing the polymer obtained by the suspension polymerization. The type of the available acid is not particularly limited. Specific examples thereof include acetic acid (pKa 4.76), propionic acid (pKa 4.87), butyric acid (pKa 4.63), octanoic acid (pKa 4.89), adipic acid (pKa 5.03), benzoic acid (pKa 4.00), formic acid (pKa 3.55), valeric acid (pKa 4.63), heptoic acid (pKa 4.66), lactic acid (pKa 3.66), phenylacetic acid (pKa 4.10), isobutyric acid (pKa 4.63) and cyclohexanecarboxylic acid (pKa 4.70). Acids that can be used especially preferably in view of the effect provided are acetic acid, propionic acid and lactic acid.

Further, the metal salt of the acid is not particularly limited. Usually, metal salts of the foregoing acids and alkali metals such as sodium and potassium are used. Sodium acetate is especially preferable.

The content of the acid and/or its metal salt (C) is preferably 0.05 to 2 parts by weight, more preferably 0.1 to 1.7 parts by weight, further preferably 0.2 to 1.5 parts by weight per 100 parts by weight of the vinyl alcohol polymer (A). When the content of the acid and/or its metal salt (C) is less than 0.05 part by weight based on the vinyl alcohol polymer (A), the effect of improving the stability in the suspension polymerization by the heat treatment is decreased. When it exceeds 2 parts by weight, the dispersion stabilizer for suspension polymerization is colored in the heat treatment or the polymer is colored in processing the polymer obtained by the suspension polymerization. Thus, it is undesirous.

The method for suspension polymerization of the vinyl compound using the dispersion stabilizer for suspension polymerization in the invention is described below.

In the suspension polymerization of the vinyl compound in the aqueous medium using the dispersion stabilizer for suspension polymerization in the invention, the temperature of the aqueous medium is not particularly limited. Cold water of approximately 20° C. and hot water of 90° C. or more can preferably be used. This aqueous medium can be pure water or an aqueous medium made of an aqueous solution containing pure water and various additives or an aqueous medium containing another organic solvent. When the aqueous medium is charged into a polymerization reaction system, the amount thereof may be an amount capable of satisfactorily heating the polymerization reaction system. Further, in order to increase a heat removal efficiency, a polymerization vessel fitted with a reflux condenser is preferably used.

The dispersion stabilizer for suspension polymerization in the invention may be used either singly or in combination with water-soluble polymer such as polyvinyl alcohol, gelatin and water-soluble cellulose ethers represented by methyl cellulose, hydroxyethyl cellulose, hydroxypropyl cellulose and hydroxypropylmethyl cellulose; oil-soluble emulsifying agents such as sorbitan monolaurate, sorbitan trioleate, glycerin tristearate and an ethylene oxide/propylene oxide block copolymer; and water-soluble emulsifying agents such as polyoxyethylenesorbitan monolaurate, polyoxyethyleneglycerin oleate and sodium laurate; which are commonly used in the suspension polymerization of a vinyl compound in an aqueous medium. The amounts thereof are not particularly limited, and are preferably 0.01 to 1.0 part by weight per 100 parts by weight of the vinyl compound.

The other additives can also be added as required. Examples of the additives include agents for controlling degree of polymerization such as acetaldehyde, butylaldehyde, trichloroethylene, perchloroethylene and mercaptans; and polymerization inhibitors such as a phenolic compound, a sulfur compound and an N-oxide compound. Further, pH adjustors, scale preventing agents and crosslinking agents can also be added as required, and the additives may be used in combination. Meanwhile, polymerization initiators which have been so far used in the polymerization of a vinyl compound such as vinyl chloride can be used. Examples thereof can include percarbonate compounds such as diisopropyl peroxydicarbonate, di-2-ethylhexyl peroxydicarbonate and diethoxyethyl peroxydicarbonate; per-ester compounds such as t-butyl peroxyneodecanate, a-cumyl peroxyneodecanate and t-butyl peroxydecanate; peroxides such as acetylcyclohexylsulfonyl peroxide and 2,4,4-trimethylpentyl 2-peroxyphenoxyacetate; and azo compounds such as 2,2'-azobisisobutyronitrile, 2,2'-azobis(2,4-dimethylvaleronitrile) and 2,2'-azobis(4-methoxy-2,4-dimethylvaleronitrile). Further, these can be used in combination with potassium persulfate, ammonium persulfate and hydrogen peroxide.

Examples of the vinyl compound to which the dispersion stabilizer for suspension polymerization in the invention can be applied include vinyl chloride, vinylidene chloride, alkylvinyl ether, maleic anhydride, acrylonitrile, itaconic acid, styrene, vinyl esters such as vinyl acetate and vinyl propionate, (meth)acrylic acid esters such as methyl (meth) acrylate and ethyl (meth)acrylate, and α-olefins such as ethylene, propylene, isobutene and isoprene. Typical of these vinyl compounds is vinyl chloride, and vinyl chloride can be used either singly or in combination with another monomer in which vinyl chloride is a main component (vinyl chloride 50% by weight or more). Examples of the comonomer to be copolymerized with vinyl chloride include vinyl esters such as vinyl acetate and vinyl propionate, (meth)acrylic acid esters such as methyl (meth) acrylate and ethyl (meth) acrylate, α-olefins such as ethylene and propylene, maleic anhydride, acrylonitrile, itaconic acid, styrene, vinylidene chloride and vinyl ether.

In the suspension polymerization of the vinyl compound using the dispersion stabilizer for suspension polymerization in the invention, the proportions of the components, the polymerization temperature and the like can be determined according to the conditions ordinarily employed in the suspension polymerization of the vinyl compound such as vinyl chloride. Further, the order of charging the vinyl compound, the polymerization initiator, the dispersion stabilizer, the aqueous medium and other additives and the proportions thereof are not particularly limited at all. Still further, a method in which hot water is used as the aqueous medium and the vinyl compound is heated before being charged into a polymerization vessel is preferable.

EXAMPLES

The following Examples illustrate the invention specifically, but not limit the scope of the invention.

In the following Examples, "%" and "part or parts" mean "% by weight" and "part or parts by weight" unless otherwise instructed. Further, polyvinyl alcohol is hereinafter sometimes abbreviated as PVA, polyvinyl acetate as PVAc and a vinyl alcohol polymer as a PVA polymer respectively.

(Analysis of a PVA Polymer)

(1) Measurement of a Degree of Polymerization

A degree of polymerization of the PVA polymer was measured according to JIS K 6726.

(2) Measurement of a Degree of Saponification

A degree of saponification of the PVA polymer was measured according to JIS K 6726.

(3) Quantitative Determination of an Acid Metal Salt

Sodium acetate contained in the PVA polymer was quantitatively determined by electrophoresis analysis using a capillary isotachophoresis analyzer (IP-3A) manufactured by Shimadzu Corporation.

(4) Coloration in Heat Treatment

After the PVA polymer was heat-treated in an atmosphere of air at 150° C. for 2 hours, an extent of coloration of the PVA polymer was visually observed, and evaluated according to the following grades.

◯: unchanged

Δ: colored pale yellow.

×: colored reddish brown.

(Evaluation of a Polymerizability of a Vinyl Chloride Monomer and Properties of a Vinyl Chloride Polymer Obtained)

(1) Particle Size Distribution

A particle size distribution was measured by dry sieving analysis using a Tyler standard wire mesh sieve.

(2) Bulk Density

A bulk density of the vinyl chloride polymer was measured according to JIS K 6721.

(3) CPA (Cold Plasticizer Absorption)

Absorption of dioctyl phthalate at 23° C. was measured by a method described in ASTM-D 3367-75.

(4) Scale Adhesion

After a polymer slurry was withdrawn from a polymerization vessel, a condition of scale adhesion within the polymerization vessel was visually observed, and evaluated according to the following grades.

◯: Adhesion of polymer scales is little confirmed.

Δ: White polymer scales can be confirmed on an inner wall of a polymerization vessel.

×: Large amounts of white polymer scales can be confirmed on an inner wall of a polymerization vessel.

(5) Coloration in Heat Treatment

After a vinyl chloride polymer was heat-treated in an atmosphere of air at 140° C. for 10 minutes, an extent of coloration of the vinyl chloride polymer was visually observed, and evaluated according to the following grades.

◯: unchanged

Δ: colored pale yellow.

×: colored yellow.

Example 1

(Production of a PVA Polymer)

Vinyl acetate (38.1 kg) and 21.8 kg of methanol were charged into a 100-liter pressure reaction vessel fitted with a stirrer, a nitrogen inlet, an ethylene inlet and an initiator inlet, and were heated at 60° C. The inside of the system was then replaced with nitrogen by nitrogen bubbling for 30 minutes. Subsequently, ethylene was introduced such that the pressure of the reaction vessel reached 0.10 MPa. A solution of 2,2'-azobis(4-methoxy-2,4-dimethylvaleronitrile) as an initiator in methanol having a concentration of 2.8 g/liter was prepared, and bubbling with a nitrogen gas was conducted for nitrogen replacement. After the inner temperature of the reaction vessel was adjusted to 60° C., 32 ml of the initiator solution was poured to start the polymerization. During the polymerization, the pressure of the reaction vessel was maintained at 0.10 MPa by introducing ethylene, the polymerization temperature was maintained at 60° C., and the initiator solution was continuously added at a rate of 102 ml/hr. After 5 hours, the conversion reached 50%, when the cooling was conducted to stop the polymerization. After the reaction vessel was opened to remove ethylene, a nitrogen gas was bubbled to completely remove ethylene. The unreacted vinyl acetate monomer was then removed under reduced pressure to obtain a methanol solution of a PVAc polymer. To the solution adjusted to 30% was added an NaOH methanol solution (10% concentration) for saponification such that an alkali molar ratio (a ratio of a molar amount of NaOH to a molar amount of a vinyl ester unit in the PVAc polymer) reached 0.006. After the saponification reaction, a solid matter in the reaction solution was pulverized, a liquid was removed by centrifugation, and the residue was vacuum-dried at 60° C. to obtain a PVA polymer. A degree of saponification of the PVA polymer was measured in a usual manner according to JIS K 6726, and found to be 85 mol %.

The methanol solution of the PVAc polymer obtained by removing the unreacted vinyl acetate monomer after the polymerization was charged into n-hexane to precipitate the PVAc polymer, and the PVAc polymer recovered was dissolved in acetone. This purification by reprecipitation was conducted three times, and the product was vacuum-dried at 60° C. to obtain the PVAc polymer purified. The content of the ethylene unit was 2 mol % as obtained by proton NMR measurement of the PVAc polymer. Further, the methanol solution of the PVAc polymer was saponified at an alkali molar ratio of 0.2. The Soxhlet extraction was conducted with methanol for 3 days, and then dried to obtain the PVA polymer purified. An average degree of polymerization of the PVA polymer was measured in a usual manner according to JIS K 6726, and found to be 1,000.

By the foregoing procedures, a PVA polymer (A) having a degree of polymerization of 1,000, a degree of saponification of 85 mol % and an ethylene content of 2 mol % was obtained. This is hereinafter designated a PVA polymer (A-1).

With respect to the polymer obtained by the foregoing procedures, the degree of polymerization of the polymer can be changed by changing the weight ratio of methanol to the monomer such as vinyl acetate in the polymerization procedure, the ethylene content of the polymer by changing the pressure of ethylene in the reaction vessel, and the degree of saponification of the polymer by changing the alkali molar ratio in the saponification procedure respectively. In these procedures, the monomer/methanol weight ratio and the pressure of ethylene in the reaction vessel were changed in the polymerization, and the alkali molar ratio was changed in the saponification to obtain a PVA polymer (B1) having a degree of polymerization of 400, a degree of saponification of 55 mol % and an ethylene content of 5 mol %. This is hereinafter designated a PVA polymer (B1-1).

(Polymerization of Vinyl Chloride)

An autoclave with glass lining was charged with 40 parts of deionized water containing a dispersion stabilizer shown in Table 1 and 0.04 part of a 70% toluene solution of diisopropyl peroxydicarbonate. The inside of the autoclave was deaerated until the pressure reached 0.0067 MPa to remove oxygen. Then, 30 parts of a vinyl chloride monomer was charged therein, and the mixture was heated at 57° C. while being stirred to conduct polymerization. At the outset of the polymerization, the pressure inside the vessel was 0.83 MPa. After 6 hours from the outset of the polymerization, this pressure reached 0.49 MPa, when the polymerization was stopped. The unreacted vinyl chloride monomer was purged, and the content was withdrawn, dehydrated, and dried. A polymerization yield of the vinyl chloride polymer was 85%. An average degree of polymerization thereof was 1,050. A polymerizability and properties of the vinyl chloride polymer were evaluated by the foregoing methods. The results of evaluation are shown in Table 2.

Examples 2 and 3

(Polymerization of Vinyl Chloride)

The suspension polymerization of vinyl chloride was conducted in the same manner as in Example 1 except that in the dispersion stabilizer, the PVA polymer (A-1) was used as the PVA polymer (A) and the PVA polymer (B1-1) as the PVA polymer (B1) and the amount of the PVA polymer (A) and the (A)/(B1) weight ratio of the PVA polymer (A) and the PVA polymer (B1) were changed as shown in Table 1. A polymerizability and properties of a vinyl chloride polymer were evaluated. The results of evaluation are shown in Table 2.

Examples 4 and 5

(Production of a PVA Polymer)

A PVA polymer (A) having a degree of polymerization of 1,700, a degree of saponification of 88 mol % and an ethylene content of 5 mol % was obtained in the same manner as in Example 1 except that the monomer/methanol weight ratio and the pressure of ethylene inside the reaction vessel were changed in the polymerization and the alkali molar ratio was changed in the saponification. This is hereinafter designated a PVA polymer (A-2). Further, a PVA polymer (B1) having a degree of polymerization of 250, a degree of saponification of 40 mol % and an ethylene content of 2 mol % was obtained in the same manner. This is hereinafter designated a PVA polymer (B1-2).

(Polymerization of Vinyl Chloride)

The suspension polymerization of vinyl chloride was conducted in the same manner as in Example 1 except that in the dispersion stabilizer, the PVA polymer (A-2) was used as the PVA polymer (A) and the PVA polymer (B1-2) as the PVA polymer (B1) and the amount of the PVA polymer (A) and the (A)/(B1) weight ratio of the PVA polymer (A) and the PVA polymer (B1) were changed as shown in Table 1. A polymerizability and properties of a vinyl chloride polymer were evaluated. The results of evaluation are shown in Table 2.

Example 6

(Production of a PVA Polymer)

A PVA polymer (B1) having a degree of polymerization of 400, a degree of saponification of 70 mol % and an ethylene content of 8 mol % was obtained in the same manner as in Example 1 except that the monomer/methanol weight ratio and the pressure of ethylene inside the reaction vessel were changed in the polymerization and the alkali molar ratio was changed in the saponification. This is hereinafter designated a PVA polymer (B1-3).

(Polymerization of Vinyl Chloride)

The suspension polymerization of vinyl chloride was conducted in the same manner as in Example 1 except that in the dispersion stabilizer, the PVA polymer (A-1) was used as the PVA polymer (A) and the PVA polymer (B1-3) as the PVA polymer (B1). A polymerizability and properties of a vinyl chloride polymer were evaluated. The results of evaluation are shown in Table 2.

Example 7

(Production of a PVA Polymer Containing a Carboxyl Group in a Side Chain)

Vinyl acetate (26.5 kg) and 33.5 kg of methanol were charged into a 100-liter pressure reaction vessel fitted with a stirrer, a nitrogen inlet, an ethylene inlet, an additive inlet and an initiator inlet, and were heated at 60° C. The inside of the system was then replaced with nitrogen by nitrogen bubbling for 30 minutes. Subsequently, ethylene was introduced such that the pressure of the reaction vessel reached 0.22 MPa. A solution of 2,2'-azobis(4-methoxy-2,4-dimethylvaleronitrile) as an initiator in methanol having a concentration of 2.8 g/liter was prepared, and a 10% solution of itaconic acid as a comonomer in methanol was prepared. These were respectively subjected to bubbling with a nitrogen gas for nitrogen replacement. After the inner temperature of the reaction vessel was adjusted to 60° C. and 11.8 g of itaconic acid was added, 95 ml of the initiator solution was poured to start the polymerization. During the polymerization, the pressure of the reaction vessel was maintained at 0.22 MPa by introducing ethylene, the polymerization temperature was maintained at 60° C., and the 10% methanol solution of itaconic acid was continuously added at a rate of 600 ml/hr and the initiator solution at a rate of 298 ml/hr respectively. After 5 hours, the conversion reached 60%, when the cooling was conducted to stop the polymerization. After the reaction vessel was opened to remove ethylene, a nitrogen gas was bubbled to completely remove ethylene. The unreacted vinyl acetate monomer was then removed under reduced pressure to obtain a methanol solution of a PVAc polymer. To the solution adjusted to 30% was added an NaOH methanol solution (10% concentration) for saponification such that an alkali molar ratio (a ratio of a molar amount of NaOH to a molar amount of a vinyl ester unit in the PVAc polymer) reached 0.003. After the saponification reaction, a solid matter in the reaction solution was pulverized, a liquid was removed by centrifugation, and the residue was vacuum-dried at 60° C. to obtain a PVA polymer. A degree of saponification of the PVA polymer was measured in a usual manner according to JIS K 6726, and found to be 55 mol %.

The methanol solution of the PVAc polymer obtained by removing the unreacted vinyl acetate monomer after the polymerization was charged into n-hexane to precipitate the PVAc polymer, and the PVAc polymer recovered was dissolved in acetone. This purification by reprecipitation was conducted three times, and the product was then vacuum-dried at 60° C. to obtain the PVAc polymer purified. The content of the ethylene unit was 5 mol % and the content of the itaconic acid unit was 1 mol % respectively as obtained by proton NMR measurement of the PVAc polymer. Further, the methanol solution of the PVAc polymer was saponified at an alkali molar ratio of 0.2. The Soxhlet extraction was conducted with methanol for 3 days, and then dried to obtain the PVA polymer purified. An average degree of polymerization of the PVA polymer was measured in a usual manner according to JIS K 6726, and found to be 400.

By the foregoing procedures, a PVA polymer (B1) having a degree of polymerization of 400, a degree of saponification of 55 mol % and an ethylene content of 5 mol % and containing a carboxyl group as an ionic group in a side chain was obtained. This is hereinafter designated an ion-modified PVA polymer (B1-4).

(Polymerization of Vinyl Chloride)

The suspension polymerization of vinyl chloride was conducted in the same manner as in Example 1 except that in the dispersion stabilizer, the PVA polymer (A-1) was used as the PVA polymer (A) and the ion-modified PVA polymer (B1-4) as the PVA polymer (B1). A polymerizability and properties of a vinyl chloride polymer were evaluated. The results of evaluation are shown in Table 2.

Example 8

(Production of a PVA Polymer Containing a Carboxyl Group at an End of Polymer Chain)

Vinyl acetate (49.7 kg) and 10.3 kg of methanol were charged into a 100-liter pressure reaction vessel fitted with a stirrer, a nitrogen inlet, an ethylene inlet, an additive inlet and an initiator inlet, and were heated at 60° C. The inside of the system was then replaced with nitrogen by nitrogen bubbling for 30 minutes. Subsequently, ethylene was introduced such that the pressure of the reaction vessel reached 0.50 MPa. A solution of 2,2'-azobis(4-methoxy-2,4-dimethylvaleronitrile) as an initiator in methanol having a concentration of 2.8 g/liter was prepared, and a 5% solution of 3-mercaptopropionic acid (hereinafter referred to as 3-MPA) as a chain transfer agent in methanol was prepared. These were respectively subjected to bubbling with a nitrogen gas for nitrogen replacement. After the inner temperature of the reaction vessel was adjusted to 60° C. and 10.2 g of 3-MPA was added, 22 ml of the initiator solution was poured to start the polymerization. During the polymerization, the pressure of the reaction vessel was maintained at 0.50 MPa by introducing ethylene, and the polymerization temperature was maintained at 60° C. The 5% methanol solution of 3-MPA was continuously added at a rate of 600 ml/hr and the initiator solution at a rate of 70 ml/hr respectively. After 5 hours, the conversion reached 40%, when the cooling was conducted to stop the polymerization. After the reaction vessel was opened to remove ethylene, a nitrogen gas was bubbled to completely remove ethylene. The unreacted vinyl acetate monomer was then removed under reduced pressure to obtain a methanol solution of a PVAc polymer. To the solution adjusted to 30% was added an NaOH methanol solution (10% concentration) for saponification such that an alkali molar ratio (a ratio of a molar amount of NaOH to a molar amount of a vinyl ester unit in the PVAc polymer) reached 0.002. After the saponification reaction, a solid matter in the reaction solution was pulverized, a liquid was removed by centrifugation, and the residue was vacuum-dried at 60° C. to obtain a PVA polymer. A degree of saponification of the PVA polymer was measured in a usual manner according to JIS K 6726, and found to be 40 mol %.

The methanol solution of the PVAc polymer obtained by removing the unreacted vinyl acetate monomer after the polymerization was charged into n-hexane to precipitate the PVAc polymer, and the PVAc polymer recovered was dissolved in acetone. This purification by reprecipitation was conducted three times, and the product was then vacuum-dried at 60° C. to obtain the PVAc polymer purified. The content of the ethylene unit was 5 mol % as obtained by proton NMR measurement of the PVAc polymer. Further, the methanol solution of the PVAc polymer was saponified at an alkali molar ratio of 0.2. The Soxhlet extraction was conducted with methanol for 3 days, and then dried to obtain the PVA polymer purified. An average degree of polymerization of the PVA polymer was measured in a usual manner according to JIS K 6726, and found to be 250.

By the foregoing procedures, a PVA polymer (B1) having a degree of polymerization of 250, a degree of saponification of 40 mol % and an ethylene content of 5 mol % and containing a carboxyl group as an ionic group at an end of polymer chain was obtained. This is hereinafter designated an end ion-modified PVA polymer (B1-5).

(Polymerization of Vinyl Chloride)

The suspension polymerization of vinyl chloride was conducted in the same manner as in Example 1 except that in the dispersion stabilizer, the PVA polymer (A-2) was used as the PVA polymer (A) and the PVA polymer (B1-5) as the PVA polymer (B1) and the (A)/(B1) weight ratio of the PVA polymer (A) and the PVA polymer (B1) was changed as shown in Table 1. A polymerizability and properties of a vinyl chloride polymer were evaluated. The results of evaluation are shown in Table 2.

Comparative Example 1

(Production of a PVA Polymer)

A PVA polymer having a degree of polymerization of 1,000 and a degree of saponification of 85 mol % was obtained in the same manner as in Example 1 except that ethylene was not used in the polymerization. This is hereinafter designated a PVA polymer (a-1).

Further, a PVA polymer having a degree of polymerization of 400 and a degree of saponification of 55 mol % was obtained as in Example 1 except that ethylene was not used and the monomer/methanol weight ratio was changed in the polymerization and the alkali molar ratio was changed in the saponification. This is hereinafter designated a PVA polymer (b1-1).

(Polymerization of Vinyl Chloride)

The suspension polymerization of vinyl chloride was conducted in the same manner as in Example 1 except that in the dispersion stabilizer, the PVA polymer (a-1) was used instead of the PVA polymer (A) and the PVA polymer (b1-1) instead of the PVA polymer (B1) and the (A)/(B1) weight ratio ((a-1)/(b1-1) weight ratio herein) was changed as shown in Table 1. A polymerizability was evaluated. Since the resulting vinyl chloride polymer was blocked in the reaction vessel, its properties were not evaluated. The results of evaluation are shown in Table 2.

Comparative Example 2

(Polymerization of Vinyl Chloride)

The suspension polymerization of vinyl chloride was conducted in the same manner as in Example 1 except that in the dispersion stabilizer, the PVA polymer (A-2) was used as the PVA polymer (A) and the PVA polymer (B1) was not used. A polymerizability and properties of a vinyl chloride polymer were evaluated. The results of evaluation are shown in Table 2.

TABLE 1

Dispersion stabilizer

| | PVA polymer (A) or PVA polymer | | | | | PVA polymer (B1) or PVA polymer | | | Ion modification | | | (A)/ |
|---|---|---|---|---|---|---|---|---|---|---|---|---|
| | | Degree of poly- | Degree of saponi- | Ethylene content | Amount (%/ | | Degree of poly- | Degree of saponi- | Ethylene content | Ionic comonomer | | End ion modification | (B1) weight |
| | Type | merization | fication (mol %) | (mol %) | monomer) | Type | merization | fication (mol %) | (mol %) | Name | (mol %) | Modification group | ratio |
| Ex. 1 | A-1 | 1000 | 85 | 2 | 0.1 | B1-1 | 400 | 55 | 5 | — | — | — | 80/20 |
| Ex. 2 | A-1 | 1000 | 85 | 2 | 0.1 | B1-1 | 400 | 55 | 5 | — | — | — | 60/40 |
| Ex. 3 | A-1 | 1000 | 85 | 2 | 0.06 | B1-1 | 400 | 55 | 5 | — | — | — | 70/30 |
| Ex. 4 | A-2 | 1700 | 88 | 5 | 0.1 | B1-2 | 250 | 40 | 2 | — | — | — | 70/30 |
| Ex. 5 | A-2 | 1700 | 88 | 5 | 0.06 | B1-2 | 250 | 40 | 2 | — | — | — | 70/30 |
| Ex. 6 | A-1 | 1000 | 85 | 2 | 0.1 | B1-3 | 400 | 70 | 8 | — | — | — | 80/20 |
| Ex. 7 | A-1 | 1000 | 85 | 2 | 0.1 | B1-4 | 400 | 55 | 5 | Itaconic acid | 1 | — | 80/20 |
| Ex. 8 | A-2 | 1700 | 88 | 5 | 0.1 | B1-5 | 250 | 40 | 5 | — | — | Carboxyl group | 70/30 |
| Comp. Ex. 1 | a-1 | 1000 | 85 | 0 | 0.1 | b1-1 | 400 | 55 | 0 | — | — | — | 60/40 |
| Comp. Ex. 2 | A-2 | 1700 | 88 | 5 | 0.1 | — | — | — | — | — | — | — | — |

TABLE 2

Polymerizability and properties of a vinyl chloride polymer

| | Particle size distribution (wt. %) | | | | | | | |
|---|---|---|---|---|---|---|---|---|
| | 42 mesh on | 60 mesh on | 60 mesh pass - 150 mesh on | 200 mesh on | 200 mesh pass | Bulk density | Plasticizer absorption (wt. %) | Scale adhesion |
| Ex. 1 | 0.0 | 0.0 | 93.9 | 6.1 | 0.0 | 0.549 | 29.1 | ○ |
| Ex. 2 | 0.0 | 0.5 | 97.8 | 1,7 | 0.0 | 0.532 | 35.4 | ○ |
| Ex. 3 | 0.0 | 2.9 | 95.7 | 1.5 | 0.0 | 0.543 | 31.8 | ○ |
| Ex. 4 | 0.0 | 6.9 | 91.5 | 1.6 | 0.0 | 0.542 | 28.0 | ○ |
| Ex. 5 | 0.0 | 1.1 | 94.5 | 4.4 | 0.0 | 0.548 | 30.0 | ○ |
| Ex. 6 | 0.0 | 2.8 | 96.2 | 1.0 | 0.0 | 0.550 | 27.9 | ○ |
| Ex. 7 | 0.0 | 0.2 | 95.0 | 4.8 | 0.0 | 0.539 | 29.6 | ○ |
| Ex. 8 | 0.0 | 5.7 | 92.7 | 1.6 | 0.0 | 0.539 | 29.2 | ○ |
| Comp. Ex. 1 | — | — | — | — | — | — | — | x |
| Comp. Ex. 2 | 0.0 | 5.3 | 82.7 | 11.0 | 0.0 | 0.549 | 22.0 | ○ |

Example 9

(Production of a PVA Polymer)

A PVA polymer (B2) having a degree of polymerization of 250 and a degree of saponification of 40 mol % was obtained in the same manner as in Example 1 except that ethylene was not used and the monomer/methanol weight ratio was changed in the polymerization and the alkali molar ratio was changed in the saponification. This is hereinafter designated a PVA polymer (B2-1).

(Polymerization of Vinyl Chloride)

An autoclave with glass lining was charged with 40 parts of deionized water having dissolved therein a dispersion stabilizer shown in Table 3 and 0.04 part of a 70% toluene solution of diisopropyl peroxydicarbonate. The inside of the autoclave was deaerated until the pressure reached 0.0067 MPa to remove oxygen. Then, 30 parts of a vinyl chloride monomer was charged therein, and the mixture was heated at 57° C. while being stirred to conduct polymerization. At the outset of the polymerization, the pressure inside the autoclave was 0.83 MPa. After 6 hours from the outset of the polymerization, this pressure reached 0.49 MPa, when the polymerization was stopped. The unreacted vinyl chloride monomer was purged, and the content was withdrawn, dehydrated, and dried. A polymerization yield of the vinyl chloride polymer was 85%. An average degree of polymerization thereof was 1,050. A polymerizability and properties of the vinyl chloride polymer were evaluated by the foregoing methods. The results of evaluation are shown in Table 4.

Examples 10 and 11

(Polymerization of Vinyl Chloride)

The suspension polymerization of vinyl chloride was conducted in the same manner as in Example 9 except that in the dispersion stabilizer, the PVA polymer (A-1) was used as the PVA polymer (A) and the PVA polymer (B2-1) as the PVA polymer (B2) and the amount of the PVA polymer (A) and the (A)/(B2) weight ratio of the PVA polymer (A) and the PVA polymer (B2) were changed as shown in Table 3. A polymerizability and properties of the resulting vinyl chloride polymer were evaluated. The results of evaluation are shown in Table 4.

Examples 12 and 13

(Polymerization of Vinyl Chloride)

The suspension polymerization of vinyl chloride was conducted in the same manner as in Example 9 except that in the dispersion stabilizer, the PVA polymer (A-2) was used as the PVA polymer (A) and the PVA polymer (B2-1) as the PVA polymer (B2) and the amount of the PVA polymer (A) and the (A)/(B2) weight ratio of the PVA polymer (A) and the PVA polymer (B2) were changed as shown in Table 3. A polymerizability and properties of a vinyl chloride polymer were evaluated. The results of evaluation are shown in Table 4.

Example 14

(Production of a PVA Polymer)

A PVA polymer (A) having a degree of polymerization of 700, a degree of saponification of 70 mol % and an ethylene content of 1.5 mol % was obtained in the same manner as in Example 1 except that the monomer/methanol weight ratio and the pressure of ethylene in the reaction vessel were changed in the polymerization and the alkali molar ratio was changed in the saponification. This is hereinafter designated a PVA polymer (A-3).

Further, a PVA polymer (B2) having a degree of polymerization of 500 and a degree of saponification of 55 mol % was obtained in the same manner as in Example 1 except that ethylene was not used and the monomer/methanol weight ratio was changed in the polymerization and the alkali molar ratio was changed in the saponification. This is hereinafter designated a PVA polymer (B2-2).

(Polymerization of Vinyl Chloride)

The suspension polymerization of vinyl chloride was conducted in the same manner as in Example 9 except that in the dispersion stabilizer, the PVA polymer (A-3) was used as the PVA polymer (A) and the PVA polymer (B2-2) as the PVA polymer (B2) and the (A)/(B2) weight ratio of the PVA polymer (A) and the PVA polymer (B2) were changed as shown in Table 3. A polymerizability and properties of a vinyl chloride polymer were evaluated. The results of evaluation are shown in Table 4.

Example 15

(Production of a PVA Polymer Containing a Carboxyl Group in a Side Chain)

Vinyl acetate (21.0 kg) and 38.9 kg of methanol were charged into a 100-liter reaction vessel fitted with a stirrer, a nitrogen inlet, a reflux condenser and an additive inlet, and were heated at 60° C. The inside of the system was then replaced with nitrogen by nitrogen bubbling for 30 minutes. A 10% solution of itaconic acid as a comonomer in methanol was prepared, and bubbling was conducted with a nitrogen gas for nitrogen replacement. After the inner temperature of the reaction vessel was adjusted to 60° C. and 9.4 g of itaconic acid was added, 50 g of 2,2'-azobis (isobutyronitrile) was added to start the polymerization. During the polymerization, the polymerization temperature was maintained at 60° C., and the 10% methanol solution of itaconic acid was continuously added at a rate of 600 ml/hr. After 5 hours, the conversion reached 65%, when the cooling was conducted to stop the polymerization. The unreacted vinyl acetate monomer was then removed under reduced pressure to obtain a methanol solution of a PVAc polymer To the solution adjusted to 30% was added an NaOH methanol solution (10% concentration) for saponification such that an alkali molar ratio (a ratio of a molar amount of NaOH to a molar amount of a vinyl ester unit in the PVAc polymer) reached 0.002. After the saponification reaction, a solid matter in the reaction solution was pulverized, a liquid was removed by centrifugation, and the residue was vacuum-dried at 60° C. to obtain a PVA polymer. A degree of saponification of the PVA polymer was measured in a usual manner according to JIS K 6726, and found to be 40 mol %.

The methanol solution of the PVAc polymer obtained by removing the unreacted vinyl acetate monomer after the polymerization was charged into n-hexane to precipitate the PVAc polymer, and the PVAc polymer recovered was dissolved in acetone. This purification by reprecipitation was conducted three times, and the product was then vacuum-dried at 60° C. to obtain the PVAc polymer purified. The content of the itaconic acid unit was 1 mol % as obtained by proton NMR measurement of the PVAc polymer. Further, the methanol solution of the PVAc polymer was saponified at an alkali molar ratio of 0.2. The Soxhlet extraction was conducted with methanol for 3 days, and then dried to obtain the PVA polymer purified. An average degree of polymerization of the PVA polymer was measured in a usual manner according to JIS K 6726, and found to be 400.

By the foregoing procedures, a PVA polymer (B2) having a degree of polymerization of 400 and a degree of saponification of 40 mol % and containing a carboxyl group as an ionic group in a side chain was obtained. This is hereinafter designated an ion-modified PVA polymer (B2-3).

(Polymerization of Vinyl Chloride)

The suspension polymerization of vinyl chloride was conducted in the same manner as in Example 9 except that in the dispersion stabilizer, the PVA polymer (A-2) was used as the PVA polymer (A) and the PVA polymer (B2-3) as the PVA polymer (B2) and the (A)/(B2) weight ratio was changed as shown in Table 3. A polymerizability and properties of a vinyl chloride polymer were evaluated. The results of evaluation are shown in Table 4.

Example 16

(Production of a PVA Polymer Containing a Carboxyl Group at an End of Polymer Chain)

Vinyl acetate (49.7 kg) and 12.3 kg of methanol were charged into a 100-liter reaction vessel fitted with a stirrer, a nitrogen inlet, an additive inlet and an initiator inlet, and were heated at 60° C. The inside of the system was then replaced with nitrogen by nitrogen bubbling for 30 minutes. A 10% solution of 3-mercaptopropionic acid (hereinafter referred to as 3-MPA) as a chain transfer agent in methanol was prepared, and bubbling was conducted with a nitrogen gas for nitrogen replacement. After the inner temperature of the reaction vessel was adjusted to 60° C. and 4.2 g of 3-MPA was added, 20 g of 2,2'-azobis(4-methoxy-2,4 dimethylvaleronitrile) was added to start the polymerization. During the polymerization, the polymerization temperature was maintained at 60° C., and the 10% methanol solution of 3-MPA was continuously added at a rate of 230 ml/hr. After 4 hours, the conversion reached 65%, when the cooling was conducted to stop the polymerization. The unreacted vinyl acetate monomer was then removed under reduced pressure to obtain a methanol solution of a PVAc polymer. To the solution adjusted to 30% was added an NaOH methanol solution (10% concentration) for saponification such that an alkali molar ratio (a ratio of a molar amount of NaOH to a molar amount of a vinyl ester unit in the PVAc polymer) reached 0.002. After the saponification reaction, a solid matter in the reaction solution was pulverized, a liquid was removed by centrifugation, and the residue was vacuum-dried at 60° C. to obtain a PVA polymer. A degree of saponification of the PVA polymer was measured in a usual manner according to JIS K 6726, and found to be 40 mol %. The methanol solution of the PVAc polymer obtained by removing the unreacted vinyl acetate monomer after the polymerization was charged into n-hexane to precipitate the PVAc polymer, and the PVAc polymer recovered was dissolved in acetone. This purification by repreciptation was conducted three times, and the product was then vacuum-dried at 60° C. to obtain the PVAc polymer purified. Further, the methanol solution of the PVAc polymer was saponified at an alkali molar ratio of 0.2. The Soxhlet extraction was conducted with methanol for 3 days, and then dried to obtain the PVA polymer purified. An average degree of polymerization of the PVA polymer was measured in a usual manner according to JIS K 6726, and found to be 350.

By the foregoing procedures, a PVA polymer (B2) having a degree of polymerization of 350 and a degree of saponification of 40 mol % and containing a carboxyl group as an ionic group at an end of polymer chain was obtained. This is hereinafter designated an end ion-modified PVA polymer (B2-4).

(Polymerization of Vinyl Chloride)

The suspension polymerization of vinyl chloride was conducted in the same manner as in Example 9 except that in the dispersion stabilizer, the PVA polymer (A-3) was used as the PVA polymer (A) and the end ion-modified PVA polymer (B2-4) as the PVA polymer (B2) and the (A)/(B2) weight ratio was changed as shown in Table 3. A polymerizability and properties of a vinyl chloride polymer were evaluated. The results of evaluation are shown in Table 4.

Comparative Example 3

(Polymerization of Vinyl Chloride)

The suspension polymerization of vinyl chloride was conducted in the same manner as in Example 9 except that in the dispersion stabilizer, the PVA polymer (a-1) was used instead of the PVA polymer (A) and the PVA polymer (B2-1) as the PVA polymer (B2). A polymerizability was evaluated. Since the resulting vinyl chloride polymer was blocked in the reaction vessel, its properties were not evaluated. The results of evaluation are shown in Table 4.

Comparative Example 4

(Polymerization of Vinyl Chloride)

The suspension polymerization of vinyl chloride was conducted in the same manner as in Example 9 except that in the dispersion stabilizer, the PVA polymer (A-1) was used as the PVA polymer (A) and the PVA polymer (B2) was not used. A polymerizability and properties of a vinyl chloride polymer were evaluated. The results of evaluation are shown in Table 4.

Comparative Example 5

(Production of a PVA Polymer)

A PVA polymer having a degree of polymerization of 1,700 and a degree of saponification of 88 mol % was obtained in the same manner as in Example 1 except that ethylene was not used and the monomer/methanol weight ratio was changed in the polymerization and the alkali molar ratio was changed in the saponification. This is hereinafter designated a PVA polymer (a-2).

(Polymerization of Vinyl Chloride)

The suspension polymerization of vinyl chloride was conducted in the same manner as in Example 9 except that in the dispersion stabilizer, the PVA polymer (a-2) was used instead of the PVA polymer (A) and the PVA polymer (B2-1) as the PVA polymer (B2) and the (A)/(B2) weight ratio ((a2)/(B2-1) weight ratio herein) was changed as shown in Table 3. A polymerizability and properties of a vinyl chloride polymer were evaluated. The results of evaluation are shown in Table 4.

Comparative Example 6

(Production of a PVA Polymer)

A PVA polymer having a degree of polymerization of 700 and a degree of saponification of 70 mol % was obtained in the same manner as in Example 1 except that ethylene was not used and the monomer/methanol weight ratio was changed in the polymerization and the alkali molar ratio was changed in the saponification. This is hereinafter designated a PVA polymer (a-3).

(Polymerization of Vinyl Chloride)

The suspension polymerization of vinyl chloride was conducted in the same manner as in Example 9 except that in the dispersion stabilizer, the PVA polymer (a-3) was used instead of the PVA polymer (A) and the PVA polymer (B2-2) as the PVA polymer (B2) and the (A)/(B2) weight ratio ((a3)/(B2-2) weight ratio herein) was changed as shown in Table 3. A polymerizability was evaluated. Since the resulting vinyl chloride polymer was blocked in the reaction vessel, its properties were not evaluated. The results of evaluation are shown in Table 4.

TABLE 3

| | | Dispersion stabilizer | | | | | | | | | |
|---|---|---|---|---|---|---|---|---|---|---|---|
| | | PVA polymer (A) or PVA polymer | | | | PVA polymer (B1) or PVA polymer | | | | | |
| | | | | | | | | | Ion modification | | |
| | Type | Degree of polymerization | Degree of saponification (mol %) | Ethylene content (mol %) | Amount (%/monomer) | Type | Degree of polymerization | Degree of saponification (mol %) | Ionic comonomer Name | (mol %) | End ion modification Modification group | (A)/(B2) weight ratio |
| Ex. 9 | A-1 | 1000 | 85 | 2 | 0.1 | B2-1 | 250 | 40 | — | — | — | 80/20 |
| Ex. 10 | A-1 | 1000 | 85 | 2 | 0.1 | B2-1 | 250 | 40 | — | — | — | 60/40 |

TABLE 3-continued

Dispersion stabilizer

| | PVA polymer (A) or PVA polymer | | | | | PVA polymer (B1) or PVA polymer | | | | | (A)/ |
|---|---|---|---|---|---|---|---|---|---|---|---|
| | | | | | | | | | Ion modification | | (B2) |
| | Type | Degree of poly-merization | Degree of saponi-fication (mol %) | Ethylene content (mol %) | Amount (%/monomer) | Type | Degree of poly-merization | Degree of saponi-fication (mol %) | Ionic comonomer Name (mol %) | End ion modification Modification group | weight ratio |
| Ex. 11 | A-1 | 1000 | 85 | 2 | 0.06 | B2-1 | 250 | 40 | — — | — | 70/30 |
| Ex. 12 | A-2 | 1700 | 88 | 5 | 0.1 | B2-1 | 250 | 40 | — — | — | 70/30 |
| Ex. 13 | A-2 | 1700 | 88 | 5 | 0.06 | B2-1 | 250 | 40 | — — | — | 70/30 |
| Ex. 14 | A-3 | 700 | 70 | 1.5 | 0.1 | B2-2 | 500 | 55 | — — | — | 60/40 |
| Ex. 15 | A-2 | 1700 | 88 | 5 | 0.1 | B2-3 | 400 | 40 | Itaconic acid   1 | — | 70/30 |
| Ex. 16 | A-3 | 700 | 70 | 1.5 | 0.1 | B2-4 | 350 | 40 | — — | Carboxyl group | 60/40 |
| Comp. Ex. 3 | a-1 | 1000 | 85 | 0 | 0.1 | B2-1 | 250 | 40 | — — | — | 80/20 |
| Comp. Ex. 4 | A-1 | 1000 | 85 | 2 | 0.1 | — | — | — | — — | — | — |
| Comp. Ex. 5 | a-2 | 1700 | 88 | 0 | 0.1 | B2-1 | 250 | 40 | | | 70/30 |
| Comp. Ex. 6 | a-3 | 700 | 70 | 0 | 0.1 | B2-2 | 500 | 55 | | | 60/40 |

TABLE 4

Polymerizability and properties of a vinyl chloride polymer

| | Particle size distribution (wt. %) | | | | | Bulk density | Plasticizer absorption (wt. %) | Scale adhesion |
|---|---|---|---|---|---|---|---|---|
| | 42 mesh on | 60 mesh on | 60 mesh pass - 150 mesh on | 200 mesh on | 200 mesh pass | | | |
| Ex. 9 | 0.0 | 0.5 | 92.8 | 6.1 | 0.0 | 0.548 | 28.1 | ○ |
| Ex. 10 | 0.0 | 0.0 | 97.8 | 2.2 | 0.0 | 0.523 | 33.4 | ○ |
| Ex. 11 | 0.0 | 6.9 | 91.1 | 2.0 | 0.0 | 0.544 | 29.8 | ○ |
| Ex. 12 | 0.0 | 6.0 | 91.4 | 2.6 | 0.0 | 0.549 | 27.0 | ○ |
| Ex. 13 | 0.0 | 1.1 | 94.9 | 4.0 | 0.0 | 0.552 | 28.0 | ○ |
| Ex. 14 | 0.0 | 1.4 | 97.3 | 0.3 | 0.0 | 0.520 | 35.8 | ○ |
| Ex. 15 | 0.0 | 2.0 | 93.6 | 4.4 | 0.0 | 0.531 | 29.6 | ○ |
| Ex. 16 | 0.0 | 1.1 | 97.0 | 1.9 | 0.0 | 0.520 | 36.1 | ○ |
| Comp. Ex. 3 | — | — | — | — | — | — | — | x |
| Comp. Ex. 4 | 0.0 | 11.0 | 83.0 | 5.0 | 0.0 | 0.545 | 20.1 | ○ |
| Comp. Ex. 5 | 0.0 | 6.1 | 84.5 | 7.5 | 1.5 | 0.460 | 25.5 | ○ |
| Comp. Ex. 6 | — | — | — | — | — | — | — | x |

Example 17

A PVA polymer (B3) having a degree of polymerization of 1,700, a degree of saponification of 98 mol % and an ethylene content of 5 mol % was obtained in the same manner as in Example 1 except that the monomer/methanol weight ratio and the pressure of ethylene inside the reaction vessel were changed in the polymerization and the alkali molar ratio was changed in the saponification. This is hereinafter designated a PVA polymer (B3-1).

(Polymerization of Vinyl Chloride)

An autoclave with glass lining was charged with 40 parts of deionized water having dissolved therein a dispersion stabilizer shown in Table 5 and 0.04 part of a 70% toluene solution of diisopropyl peroxydicarbonate. The inside of the autoclave was deaerated until the pressure reached 0.0067 MPa to remove oxygen. Then, 30 parts of a vinyl chloride monomer was charged therein, and the mixture was heated at 57° C. while being stirred to conduct polymerization. At the outset of the polymerization, the pressure inside the autoclave was 0.83 MPa. After 7 hours from the outset of the polymerization, this pressure reached 0.44 Pa, when the polymerization was stopped. The unreacted vinyl chloride monomer was purged, and the content was withdrawn, dehydrated, and dried. A polymerization yield of the vinyl chloride polymer was 85%. Almost no scale adhesion was observed, and an average degree of polymerization was 1,050. Properties of the resulting vinyl chloride polymer were evaluated, and the results are shown in Table 6. A vinyl chloride polymer having a high bulk density of 0.575 g/cc and a sharp particle size distribution could be obtained with a good polymerization stability.

Example 18

(Production of a PVA Polymer)

A PVA polymer (A) having a degree of polymerization of 700, a degree of saponification of 80 mol % and an ethylene content of 2 mol % was obtained in the same 1:5 manner as in Example 1 except that the monomer/methanol weight ratio and the pressure of ethylene inside the reaction vessel were changed in the polymerization and the alkali molar ratio was changed in the saponification. This is hereinafter designated a PVA polymer (A-4).

(Polymerization of Vinyl Chloride)

The suspension polymerization of vinyl chloride was conducted in the same manner as in Example 17 except that in the dispersion stabilizer, the PVA polymer (A-4) was used as the PVA polymer (A) and the PVA polymer (B3-1) as the PVA polymer (B3). A polymerizability and properties of a vinyl chloride polymer were evaluated. The results of evaluation are shown in Table 6.

Example 19

(Production of a PVA Polymer)

A PVA polymer (B3) having a degree of polymerization of 1,700, a degree of saponification of 95 mol % and an ethylene content of 5 mol % was obtained in the same manner as in Example 1 except that the monomer/methanol weight ratio and the pressure of ethylene inside the reaction vessel were changed in the polymerization and the alkali molar ratio was changed in the saponification. This is hereinafter designated a PVA polymer (B3-2).

(Polymerization of Vinyl Chloride)

The suspension polymerization of vinyl chloride was conducted in the same manner as in Example 17 except that in the dispersion stabilizer, the PVA polymer (A-4) was used as the PVA polymer (A) and the PVA polymer (B3-2) as the PVA polymer (B3). A polymerizability and properties of a vinyl chloride polymer were evaluated. The results of evaluation are shown in Table 6.

Example 20

(Production of a PVA Polymer)

A PVA polymer (B3) having a degree of polymerization of 1,700, a degree of saponification of 93 mol % and an ethylene content of 5 mol % was obtained in the same manner as in Example 1 except that the monomer/methanol weight ratio and the pressure of ethylene inside the reaction vessel were changed in the polymerization and the alkali molar ratio was changed in the saponification. This is hereinafter designated a PVA polymer (B3-3).

(Polymerization of Vinyl Chloride)

The suspension polymerization of vinyl chloride was conducted in the same manner as in Example 17 except that in the dispersion stabilizer, the PVA polymer (A-4) was used as the PVA polymer (A) and the PVA polymer (B3-3) as the PVA polymer (B3). A polymerizability and properties of a vinyl chloride polymer were evaluated. The results of evaluation are shown in Table 6.

Example 21

(Polymerization of Vinyl Chloride)

The suspension polymerization of vinyl chloride was conducted in the same manner as in Example 17 except that in the dispersion stabilizer, the PVA polymer (A-4) was used as the PVA polymer (A) and the PVA polymer (B3-1) as the PVA polymer (B3) and the (A)/(B3) weight ratio of the PVA polymer (A) and the PVA polymer (B3) was changed. A polymerizability and properties of a vinyl chloride polymer were evaluated. The results of evaluation are shown in Table 6.

Example 22

(Polymerization of Vinyl Chloride)

The suspension polymerization of vinyl chloride was conducted in the same manner as in Example 17 except that in the dispersion stabilizer, the PVA polymer (A-4) was used as the PVA polymer (A) and the PVA polymer (B3-1) as the PVA polymer (B3) and the amounts of the PVA polymer (A) and the PVA polymer (B3) were changed. A polymerizability and properties of a vinyl chloride polymer were evaluated. The results of evaluation are shown in Table 6.

Example 23

(Production of a PVA Polymer Containing a Carboxyl Group in a Side Chain)

Vinyl acetate (35.0 kg) and 25.0 kg of methanol were charged into a 100-liter reaction vessel fitted with a stirrer, a nitrogen inlet, an ethylene inlet, an additive inlet and an initiator inlet, and were heated at 60° C. The inside of the system was then replaced with nitrogen by nitrogen bubbling for 30 minutes. Subsequently, ethylene was introduced such that the pressure of the reaction vessel reached 0.33 MPa. A solution of 2,2'-azobis(4-methoxy-2, 4dimethylvaleronitrile) as an initiator in methanol having a concentration of 2.8 g/liter was prepared, and a 10% solution of itaconic acid as a comonomer in methanol was prepared. These were respectively subjected to bubbling with a nitrogen gas for nitrogen replacement. After the inner temperature of the reaction vessel was adjusted to 60° C. and 15.7 g of itaconic acid was added, 40 ml of the initiator solution was poured to start the polymerization. During the polymerization, the pressure of the reaction vessel was maintained at 0.33 MPa by 'introducing ethylene, and the polymerization temperature was maintained at 60° C. The 10% methanol solution of itaconic acid was continuously added at a rate of 600 ml/hr and the initiator solution at a rate of 124 ml/hr respectively. After 5 hours, the conversion reached 45%, when the cooling was conducted to stop the polymerization. The reaction vessel was opened to remove ethylene, and a nitrogen gas was then bubbled to completely remove ethylene. Subsequently, the unreacted vinyl acetate monomer was removed under reduced pressure to obtain a methanol solution of a PVAc polymer. To the solution adjusted to 30% was added an NaOH methanol solution (10% concentration) for saponification such that an alkali molar ratio (a ratio of a molar amount of NaOH to a molar amount of a vinyl ester unit in the PVAc Polymer) reached 0.008. After the saponification reaction, a solid matter in the reaction solution was pulverized, a liquid was removed by centrifugation, and the residue was vacuum-dried at 60° C. to obtain a PVA polymer. A degree of saponification of the PVA polymer was measured in a usual manner according to JIS K 6726, and found to be 85 mol %.

The methanol solution of the PVAc polymer obtained by removing the unreacted vinyl acetate monomer after the polymerization was charged into n-hexane to precipitate the PVAc polymer, and the PVAc polymer recovered was dissolved in acetone. This purification by reprecipitation was conducted three times, and the product was then vacuum-dried at 60° C. to obtain the PVAc polymer purified. The content of the ethylene unit was 5 mol % and the content of the itaconic acid unit 1 mol % respectively as obtained by proton NMR measurement of the PVAc polymer. Further, the methanol solution of the PVAc polymer was saponified at an alkali molar ratio of 0.2. The Soxhlet extraction was conducted with methanol for 3 days, and then dried to obtain the PVA polymer purified. An average degree of polymerization of the PVA polymer was measured in a usual manner according to JIS K 6726, and found to be 700.

By the foregoing procedures, a PVA polymer (A) having a degree of polymerization of 700, a degree of saponification of 85 mol % and an ethylene content of 5 mol % and containing a carboxyl group as an ionic group in a side chain was obtained. This is hereinafter designated an ion-modified PVA polymer (A-5).

(Polymerization of Vinyl Chloride)

The suspension polymerization of vinyl chloride was conducted in the same manner as in Example 17 except that in the dispersion stabilizer, the PVA polymer (A-5) was used as the PVA polymer (A) and the PVA polymer (B3-1) as the PVA polymer (B3). A polymerizability and properties of a vinyl chloride polymer were evaluated. The results of evaluation are shown in Table 6.

Comparative Example 7

(Production of a PVA Polymer)

A PVA polymer having a degree of polymerization of 700 and a degree of saponification of 80 mol % was obtained in the same manner as in Example 1 except that ethylene was not used and the monomer/methanol molar ratio was changed in the polymerization and the alkali molar ratio was changed in the saponification. This is hereinafter designated a PVA polymer (A-4).

Polymerization of Vinyl Chloride)

The suspension polymerization of vinyl chloride was conducted in the same manner as in Example 17 except that the PVA polymer (a-4) was used instead of the PVA polymer (A) and the PVA polymer (B3) was not used. A polymerizability and properties of a vinyl chloride polymer were evaluated. The results of evaluation are shown in Table 6.

Comparative Example 8

(Production of a PVA Polymer)

A PVA polymer having a degree of polymerization of 1,700 and a degree of saponification of 95 mol % was obtained in the same manner as in Example 1 except that ethylene was not used and the monomer/methanol molar ratio was changed in the polymerization and the alkali molar ratio was changed in the saponification. This is hereinafter designated a PVA polymer (b3-2).

(Polymerization of Vinyl Chloride)

The suspension polymerization of vinyl chloride was conducted in the same manner as in Example 17 except that in the dispersion stabilizer, the PVA polymer (a-4) was used instead of the PVA polymer (A) and the PVA polymer (b3-2) instead of the PVA polymer (B3). A polymerizability and properties of a vinyl chloride polymer were evaluated. The results of evaluation are shown in Table 6.

Comparative Example 9

(Polymerization of Vinyl Chloride)

The suspension polymerization of vinyl chloride was conducted in the same manner as in Example 17 except that in the dispersion stabilizer, the PVA polymer (A-4) was used as the PVA polymer (A) and the PVA polymer (b3-2) instead of the PVA polymer (B3). A polymerizability and properties of a vinyl chloride polymer were evaluated. The results of evaluation are shown in Table 6.

Comparative Example 10

(Polymerization of Vinyl Chloride)

The suspension polymerization of vinyl chloride was conducted in the same manner as in Example 17 except that in the dispersion stabilizer, the PVA polymer (a-4) was used instead of the PVA polymer (A) and the PVA polymer (B3-2) as the PVA polymer (B3). A polymerizability and properties of a vinyl chloride polymer were evaluated. The results of evaluation are shown in Table 6.

TABLE 5

| | Dispersion stabilizer | | | | | | | | | | |
|---|---|---|---|---|---|---|---|---|---|---|---|
| | PVA polymer (A) or PVA polymer | | | | | PVA polymer (B3) or PVA polymer | | | | | |
| | Type | Degree of polymerization | Degree of sponification (mol %) | Ethylene content (mol %) | Ionic comonomer | | Type | Degree of polymerization | Degree of saponification (mol %) | Ethylene content (mol %) | (A)/(B3) weight ratio | Amount (% monomer) |
| Ex. 17 | A-1 | 1000 | 85 | 2 | — | — | B3-1 | 1700 | 98 | 5 | 50/50 | 0.1 |
| Ex. 18 | A-4 | 700 | 80 | 2 | — | — | B3-1 | 1700 | 98 | 5 | 50/50 | 0.1 |
| Ex. 19 | A-4 | 700 | 80 | 2 | — | — | B3-2 | 1700 | 95 | 5 | 50/50 | 0.1 |
| Ex. 20 | A-4 | 700 | 80 | 2 | — | — | B3-3 | 1700 | 93 | 5 | 50/50 | 0.1 |
| Ex. 21 | A-4 | 700 | 80 | 2 | — | — | B3-1 | 1700 | 98 | 5 | 70/30 | 0.1 |
| Ex. 22 | A-4 | 700 | 80 | 2 | — | — | B3-1 | 1700 | 98 | 5 | 50/50 | 0.06 |
| Ex. 23 | A-5 | 700 | 85 | 2 | Itaconic acid | 1 | B3-1 | 1700 | 98 | 5 | 50/50 | 0.1 |
| Comp. Ex. 7 | a-4 | 700 | 80 | 0 | — | — | — | — | — | — | 100/0 | 0.1 |
| Comp. Ex. 8 | a-4 | 700 | 80 | 0 | — | — | b3-2 | 1700 | 95 | 0 | 50/50 | 0.1 |
| Comp. Ex. 9 | A-4 | 700 | 80 | 2 | — | — | b3-2 | 1700 | 95 | 0 | 50/50 | 0.1 |
| Comp. Ex. 10 | a-4 | 700 | 80 | 0 | — | — | B3-2 | 1700 | 95 | 5 | 50/50 | 0.1 |

TABLE 6

Polymerizability and properties of a vinyl chloride polymer

|  | Particle size distribution (wt. %) | | | | | Bulk density | Plasticizer absorption (wt. %) | Scale adhesion |
|---|---|---|---|---|---|---|---|---|
|  | 42 mesh on | 60 mesh on | 60 mesh pass - 150 mesh on | 200 mesh on | 200 mesh pass | | | |
| Ex. 17 | 0 | 8.3 | 85.6 | 6.1 | 0 | 0.575 | 24 | ○ |
| Ex. 18 | 0 | 8.3 | 86.6 | 5.1 | 0 | 0.570 | 24 | ○ |
| Ex. 19 | 0 | 9.2 | 86.8 | 4.0 | 0 | 0.560 | 24 | ○ |
| Ex. 20 | 0 | 7.5 | 87.0 | 5.5 | 0 | 0.555 | 25 | ○ |
| Ex. 21 | 0 | 6.4 | 86.2 | 7.4 | 0 | 0.568 | 24 | ○ |
| Ex. 22 | 0 | 6.8 | 88.0 | 5.2 | 0 | 0.560 | 27 | ○ |
| Ex. 23 | 0 | 7.1 | 89.0 | 3.9 | 0 | 0.575 | 26 | ○ |
| Comp. Ex. 7 | 0 | 10.1 | 82.2 | 7.2 | 0.5 | 0.490 | 25 | Δ |
| Comp. Ex. 8 | 1.5 | 13.4 | 78.1 | 6.4 | 0.6 | 0.550 | 23 | x |
| Comp. Ex. 9 | 1.0 | 12.8 | 82.1 | 4.1 | 0 | 0.545 | 23 | Δ |
| Comp. Ex. 10 | 0.5 | 10.5 | 80.4 | 8.6 | 0 | 0.555 | 22 | Δ |

Example 24

(Production of a PVA Polymer)

A PVA polymer (A) having a degree of polymerization of 1,000, a degree of saponification of 85 mol % and an ethylene content of 2 mol % was obtained in the same manner as in Example 1 except that after the saponification reaction of the PVAc polymer, the PVA polymer obtained was washed at 25° C. using methanol in an amount which was 30 times as large as the PVA polymer on the weight basis, vacuum-dried at 60° C. and then heat-treated in air at 150° C. for 2 hours. This is hereinafter designated a PVA polymer (A-6). The PVA polymer (A-6) was analyzed by electrophoresis. Consequently, the content of sodium acetate was 0.7 part by weight per 100 parts by weight of the PVA polymer. Further, coloration was not observed in the PVA polymer (A-6) heat-treated.

(Polymerization of Vinyl Chloride)

An autoclave with glass lining was charged with 40 parts of deionized water having dissolved therein a PVA polymer shown in Table 7 and 0.016 part of a 70% toluene solution of diisopropyl peroxydicarbonate. The inside of the autoclave was deaerated until the pressure reached 0.0067 MPa to remove oxygen. Then, 30 parts of a vinyl chloride monomer was charged therein, and the mixture was heated at 65° C. while being stirred to conduct polymerization. At the outset of the polymerization, the pressure inside the autoclave was 1.08 MPa. After 6 hours from the outset of the polymerization, the pressure reached 0.44 MPa, when the polymerization was stopped. The unreacted vinyl chloride monomer was purged, and the content was withdrawn, dehydrated, and dried.

Scale adhesion and coloration in the heat treatment of the vinyl chloride polymer were evaluated by the foregoing methods. The results of evaluation are shown in Table 7.

Example 25

(Polymerization of Vinyl Chloride)

The suspension polymerization of vinyl chloride was conducted in the same manner as in Example 24 except that the PVA polymer (B2-1) was used instead of the PVA polymer (B1-1) and the amount of the PVA polymer and the (A)/(B) weight ratio of the PVA polymer (A) and the PVA polymer (B) were changed as shown in Table 7. Scale adhesion and coloration in the heat treatment of the vinyl chloride polymer were evaluated. The results of evaluation are shown in Table 7.

Example 26

(Polymerization of Vinyl Chloride)

The suspension polymerization of vinyl chloride was conducted in the same manner as in Example 24 except that the PVA polymer (B3-1) was used instead of the PVA polymer (B1-1) and the amount of the PVA polymer and the (A)/(B) weight ratio of the PVA polymer (A) and the PVA polymer (B) were changed as shown in Table 7. Scale adhesion and coloration in the heat treatment of the vinyl chloride polymer were evaluated. The results of evaluation are shown in Table 7.

Comparative Example 11

(Production of a PVA Polymer)

A PVA polymer (A) having a degree of polymerization of 1,000, a degree of saponification of 85 mol % and an ethylene content of 2 mol % was obtained in the same manner as in Example 1 except that after the saponification reaction of the PVAc polymer, a procedure of washing the resulting PVA polymer with methanol at 25° C. in an amount of 30 times as large as that of the PVA polymer on the weight basis was repeated until the content of sodium acetate became 0.02 part by weight per 100 parts by weight of the PVA polymer as analyzed by electrophoresis, and the resulting polymer was vacuum-dried at 60° C. and heat-treated in air at 150° C. for 2 hours. This is hereinafter designated a PVA polymer (A-7). The analysis of the PVA polymer (A-7) by electrophoresis revealed that the content of sodium acetate was 0.02 part by weight per 100 parts by weight of the PVA polymer. Further, the PVA polymer (A-7) heat-treated was unchanged.

(Polymerization of Vinyl Chloride)

The suspension polymerization of vinyl chloride was conducted in the same manner as in Example 24 except that the PVA polymer (A-7) was used instead of the PVA polymer (A-6). Scale adhesion and coloration in the heat treatment of the vinyl chloride polymer were evaluated. The results of evaluation are shown in Table 7.

Comparative Example 12

(Production of a PVA Polymer)

A PVA polymer (A) having a degree of polymerization of 1,000, a degree of saponification of 85 mol % and an ethylene content of 2 mol % was obtained in the same manner as in Example 1 except that in the saponification reaction of the PVAc polymer, an NaOH methanol solution (10% concentration) was added to the methanol solution of the PVAc polymer adjusted to 30% such that an alkali molar ratio (a ratio of a molar amount of NaOH to a molar amount of a vinyl ester unit in the PVAc Polymer) became 0.006, 0.3 kg of sodium acetate was further added for saponification, vacuum drying was conducted at 60° C. and the resulting PVA polymer was heat-treated in air at 150° C. for 2 hours. This is hereinafter designated a PVA polymer (A-8). The analysis of the PVA polymer (A-8) by electrophoresis revealed that the content of sodium acetate was 2.5 parts by weight per 100 parts by weight of the PVA polymer. The PVA polymer (A-8) heat-treated was colored reddish brown.

(Polymerization of Vinyl Chloride)

The suspension polymerization of vinyl chloride was conducted in the same manner as in Example 24 except that the PVA polymer (A-8) was used instead of the PVA polymer (A-6). Scale adhesion and coloration in the heat treatment of the vinyl chloride polymer were evaluated. The results of evaluation are shown in Table 7.

Comparative Example 13

(Polymerization of Vinyl Chloride)

The suspension polymerization of vinyl chloride was conducted in the same manner as in Example 25 except that the PVA polymer (A-7) was used instead of the PVA polymer (A-6). Scale adhesion and coloration in the heat treatment of the vinyl chloride polymer were evaluated. The results of evaluation are shown in Table 7.

Comparative Example 14

(Polymerization of Vinyl Chloride)

The suspension polymerization of vinyl chloride was conducted in the same manner as in Example 25 except that the PVA polymer (A-8) was used instead of the PVA polymer (A-6). Scale adhesion and coloration in the heat treatment of the vinyl chloride polymer were evaluated. The results of evaluation are shown in Table 7.

Comparative Example 15

(Polymerization of Vinyl Chloride)

The suspension polymerization of vinyl chloride was conducted in the same manner as in Example 26 except that the PVA polymer (A-7) was used instead of the PVA polymer (A-6). Scale adhesion and coloration in the heat treatment of the vinyl chloride polymer were evaluated. The results of evaluation are shown in Table 7.

Comparative Example 16

(Polymerization of Vinyl Chloride)

The suspension polymerization of vinyl chloride was conducted in the same manner as in Example 26 except that the PVA polymer (A-8) was used instead of the PVA polymer (A-6). Scale adhesion and coloration in the heat treatment of the vinyl chloride polymer were evaluated. The results of evaluation are shown in Table 7.

TABLE 7

| | Dispersion stabilizer | | | | | | Polymerizability and properties of a vinyl chloride polymer | | |
|---|---|---|---|---|---|---|---|---|---|
| | PVA polymer | | | | Acid or acid metal salt (C) | | Coloration of | | |
| | Type of polymer (A) | Type of polymer (B) | (A)/(B) weight ratio | Amount (%/monomer) | Type | (C)/(A) weight ratio | PVA polymer (A) | Coloration | Scale adhesion |
| Ex. 24 | A-6 | B1-1 | 80/20 | 0.125 | Sodium acetate | 0.007 | ○ | ○ | ○ |
| Ex. 25 | A-6 | B2-1 | 60/40 | 0.167 | Sodium acetate | 0.007 | ○ | ○ | ○ |
| Ex. 26 | A-6 | B3-1 | 50/50 | 0.100 | Sodium acetate | 0.007 | ○ | ○ | ○ |
| Comp. Ex. 11 | A-7 | B1-1 | 80/20 | 0.125 | Sodium acetate | 0.0002 | ○ | ○ | x |
| Comp. Ex. 12 | A-8 | B1-1 | 80/20 | 0.125 | Sodium acetate | 0.025 | x | x | ○ |
| Comp. Ex. 13 | A-7 | B2-1 | 60/40 | 0.167 | Sodium acetate | 0.0002 | ○ | ○ | x |
| Comp. Ex. 14 | A-8 | B2-1 | 60/40 | 0.167 | Sodium acetate | 0.025 | x | x | ○ |
| Comp. Ex. 15 | A-7 | B3-1 | 50/50 | 0.100 | Sodium acetate | 0.0002 | ○ | ○ | x |
| Comp. Ex. 16 | A-8 | B3-1 | 50/50 | 0.100 | Sodium acetate | 0.025 | x | x | ○ |

The dispersion stabilizer for suspension polymerization of a vinyl compound in the invention, by the use of a small amount, exhibits quite an excellent suspension polymerization stability. Further, the suspension polymerization of the vinyl compound using this dispersion stabilizer can produce a vinyl polymer having characteristics that a particle size distribution of polymer granules is sharp, scattering less occurs in handing, a biting property into a molding machine is good, a rate of plasticizer absorption is high to give a high processability, a monomer remaining in polymer granules is easy to remove, fish eyes in a molded product are decreased due to a porosity of polymer granules and a bulk density is high. Thus, its industrial evaluation is quite high.

Although the invention has been fully described in connection with the preferred embodiments thereof, those skilled in the art will readily conceive of numerous changes and modifications within the framework of obviousness upon the reading of the specification herein presented of the invention. Accordingly, such changes and modifications are, unless they depart from the scope of the invention as delivered from the claims annexed thereto, to be construed as included therein.

Japanese Patent Applications 219615/2000, 219616/2000 and 219618/2000 are hereby incorporated by reference.

What is claimed is:

1. A dispersion stabilizer for suspension polymerization of a vinyl compound comprising a vinyl alcohol polymer (A) having
    a content of an ethylene unit of 0.5 to 10 mol %,
    a degree of saponification of 60 mol % or more and
    a degree of polymerization of 600 or more and
a vinyl alcohol polymer (B) selected from the group consisting of
    a vinyl alcohol polymer (B1) having
        a content of an ethylene unit of 0.5 to 10 mol %,
        a degree of saponification of 20 to 80 mol % and
        a degree of polymerization of 100 to 600,
    a vinyl alcohol polymer (B2) having
        a degree of saponification of 20 to 55 mol % and
        a degree of polymerization of 100 to 600 and
    a vinyl alcohol polymer (B3) having
        a content of an ethylene unit of 0.5 to 10 mol %,
        a degree of saponification of 90 mol % or more and
        a degree of polymerization of 1,000 or more.

2. The dispersion stabilizer according to claim 1, wherein the vinyl alcohol polymer (B) is a vinyl alcohol polymer (B1), and a difference in degree of saponification between the vinyl alcohol polymer (A) and the vinyl alcohol polymer (B1) is 15 mol % or more and/or a difference in degree of polymerization therebetween is 200 or more.

3. The dispersion stabilizer according to claim 1, wherein the vinyl alcohol polymer (B) is a vinyl alcohol polymer (B2), and a difference in degree of saponification between the vinyl alcohol polymer (A) and the vinyl alcohol polymer (B2) is 15 mol % or more and/or a difference in degree of polymerization therebetween is 200 or more.

4. The dispersion stabilizer according to claim 1, wherein the vinyl alcohol polymer (B) is a vinyl alcohol polymer (B3), and a difference in degree of saponification between the vinyl alcohol polymer (A) and the vinyl alcohol polymer (B3) is 5 mol % or more and/or a difference in degree of polymerization therebetween is 200 or more.

5. The dispersion stabilizer according to claim 1, wherein the vinyl alcohol polymer (A) and the vinyl alcohol polymer (B) are contained at a component (A)/component (B) weight ratio of 95/5 to 20/80.

6. The dispersion stabilizer according to claim 1, wherein the vinyl alcohol polymer (B) is a water-soluble or water-dispersible polymer having a group which is a sulfonic group, an amino group, an ammonium group, a carboxyl group or a cationic group.

7. The dispersion stabilizer according to claim 1, wherein the vinyl alcohol polymer (A) is heat-treated in an atmosphere of oxygen, air or nitrogen at a temperature of 100 to 200° C. for 0.5 to 20 hours.

8. The dispersion stabilizer according to claim 7, wherein an acid having pKa of 3.5 to 5.5 and/or its metal salt (C) is contained in an amount of 0.05 to 2 parts by weight per 100 parts by weight of the vinyl alcohol polymer (A).

9. The dispersion stabilizer of claim 1 in a mixture with a vinyl compound.

10. A method of using a dispersion stabilizer, the method comprising suspension polymerizing a vinyl compound in the presence of the dispersion stabilizer of claim 1.

11. A method of making a dispersion stabilizer, the method comprising mixing
    a vinyl alcohol polymer (A) having
        a content of an ethylene unit of 0.5 to 10 mol %,
        a degree of saponification of 60 mol % or more and
        a degree of polymerization of 600 or more and
    a vinyl alcohol polymer (B) selected from the group consisting of
        a vinyl alcohol polymer (B1) having
            a content of an ethylene unit of 0.5 to 10 mol %,
            a degree of saponification of 20 to 80 mol % and
            a degree of polymerization of 100 to 600,
        a vinyl alcohol polymer (B2) having
            a degree of saponification of 20 to 55 mol % and
            a degree of polymerization of 100 to 600 and
        a vinyl alcohol polymer (B3) having
            a content of an ethylene unit of 0.5 to 10 mol %,
            a degree of saponification of 90 mol % or more and
            a degree of polymerization of 1,000 or more; and
producing the dispersion stabilizer of claim 1.

12. The dispersion stabilizer according to claim 9, wherein in the vinyl compound is vinyl chloride.

13. The dispersion stabilizer according to claim 1, wherein the vinyl alcohol polymer (A) has a content of an ethylene unit of 0.5 to 8 mol %.

14. The dispersion stabilizer according to claim 1, wherein
    the vinyl alcohol polymer (B) comprises the vinyl alcohol polymer (B1); and
    the vinyl alcohol polymer (B1) has a degree of polymerization of 100 to 550.

15. The dispersion stabilizer according to claim 1, wherein
    the vinyl alcohol polymer (B) comprises the vinyl alcohol polymer (B2); and
    the vinyl alcohol polymer (B2) has a degree of polymerization of 100 to 550.

16. The dispersion stabilizer according to claim 1, wherein
    the vinyl alcohol polymer (B) comprises the vinyl alcohol polymer (B3); and
    the vinyl alcohol polymer (B3) has a degree of saponification of 91 mol % or more.

* * * * *